United States Patent
Jia et al.

(10) Patent No.: US 10,261,926 B2
(45) Date of Patent: Apr. 16, 2019

(54) SEMAPHORE FOR MULTI-CORE PROCESSOR

(71) Applicant: NXP USA, INC., Austin, TX (US)

(72) Inventors: Liang Jia, Suzhou (CN); Zhijun Chen, Suzhou (CN); Zhiling Sui, Suzhou (CN)

(73) Assignee: NXP USA, INC., Austin, TX (US)

( * ) Notice: Subject to any disclaimer, the term of this patent is extended or adjusted under 35 U.S.C. 154(b) by 200 days.

(21) Appl. No.: 15/358,135

(22) Filed: Nov. 22, 2016

(65) Prior Publication Data

US 2017/0315942 A1 Nov. 2, 2017

(30) Foreign Application Priority Data

Apr. 28, 2016 (CN) .......................... 2016 1 0273703

(51) Int. Cl.
*G06F 13/26* (2006.01)
*G06F 13/42* (2006.01)

(52) U.S. Cl.
CPC .......... *G06F 13/26* (2013.01); *G06F 13/4221* (2013.01)

(58) Field of Classification Search
CPC .............................. G06F 13/26; G06F 13/4221
See application file for complete search history.

(56) References Cited

U.S. PATENT DOCUMENTS

| 5,276,886 A | 1/1994 | Dror |
| 6,018,785 A | 1/2000 | Wenniger |
| 6,874,049 B1 | 3/2005 | Wyland |
| 7,155,551 B2 | 12/2006 | Kolinummi et al. |
| 7,877,524 B1 * | 1/2011 | Annem ................... G06F 13/28 710/22 |
| 2004/0103231 A1 * | 5/2004 | Zhu ........................ G06F 13/364 710/113 |
| 2006/0136640 A1 * | 6/2006 | Tuan ......................... G06F 9/52 710/260 |
| 2011/0179200 A1 * | 7/2011 | Sukonik .............. G06F 13/1626 710/53 |
| 2015/0067215 A1 | 3/2015 | Henry et al. |
| 2015/0067250 A1 | 3/2015 | Henry et al. |

OTHER PUBLICATIONS

Alexandra Fedorova,Sergey Blagodurov, Sergey Zhuravlev; "Managing Contention for Shared Resources on Multicore Processors", Simon Fraser University, vol. 53 Issue 2, Feb. 2010, pp. 49-57.

* cited by examiner

*Primary Examiner* — Henry Tsai
*Assistant Examiner* — John B Roche
(74) *Attorney, Agent, or Firm* — Charles E. Bergere

(57) ABSTRACT

A multi-core processor manages contention amongst its cores for access to a shared resource using a semaphore that maintains separate access-request queues for different cores and uses a selectable scheduling algorithm to grant pending requests, one at a time. The semaphore signals the core whose request is granted by sending it an interrupt signal using a dedicated core line that is not part of the system bus. The granted request is then de-queued, and the core accesses the shared resource in response to receiving the interrupt signal. The use of dedicated core lines for transmitting interrupt signals from the semaphore to the cores alleviates the need for repeated polling of the semaphore on the system bus. The use of the scheduling algorithm prevents a potential race condition between contending cores.

10 Claims, 8 Drawing Sheets

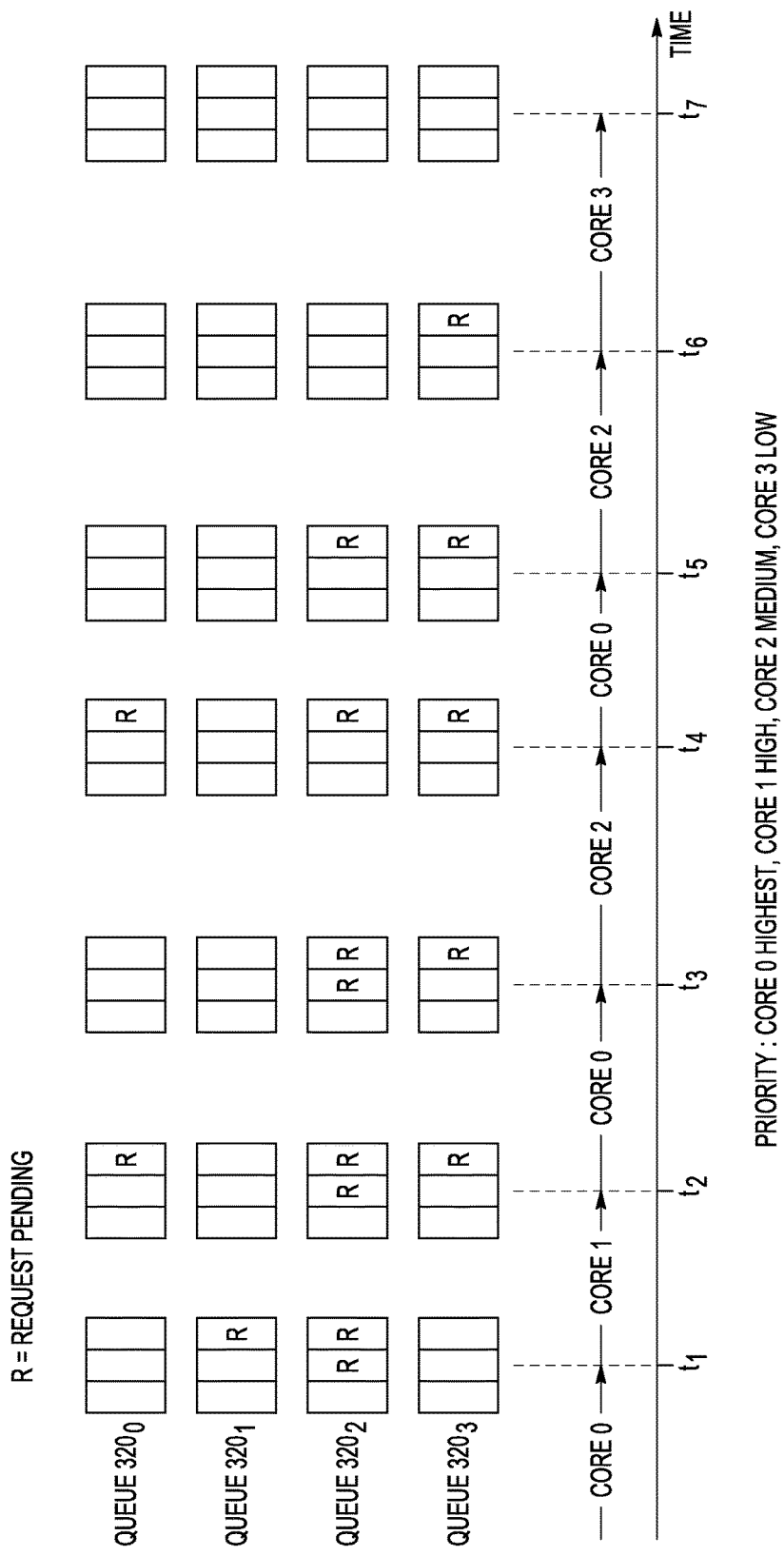

SEMAPHORE FOR MULTI-CORE PROCESSOR

BACKGROUND

The present invention relates to multi-core processors and, more specifically, to a semaphore that can be used in a multi-core processor.

In multi-core systems, a semaphore is a device used to control access by multiple processes to a shared resource in a parallel-programming or multi-user environment. For example, in some conventional multi-core processors, a core has to poll the semaphore before it can access a shared resource. If the shared resource is occupied by another core, then the polling operation is repeated until the shared resource is released. If the number of cores is relatively large, then a relatively high percentage of the system's bus capacity could disadvantageously be wasted on such repeated polling operations. Accordingly, it is an object of the present invention to provide a semaphore for a multi-core system that improves bus usage.

BRIEF DESCRIPTION OF THE DRAWINGS

Embodiments of the present invention(s) are illustrated herein by way of example and are not limited by the accompanying figures, in which like references indicate similar elements. Elements in the figures are illustrated for simplicity and clarity and have not necessarily been drawn to scale. Various aspects, features, and benefits of the disclosed embodiments will become more fully apparent, by way of example, from the following detailed description that refers to the accompanying figures, in which:

FIGS. 5A-5C are timing diagrams that graphically illustrate three example scheduling algorithms that can be used in the system of FIG. 1 according to an embodiment of the invention.

DETAILED DESCRIPTION

Figure 1:
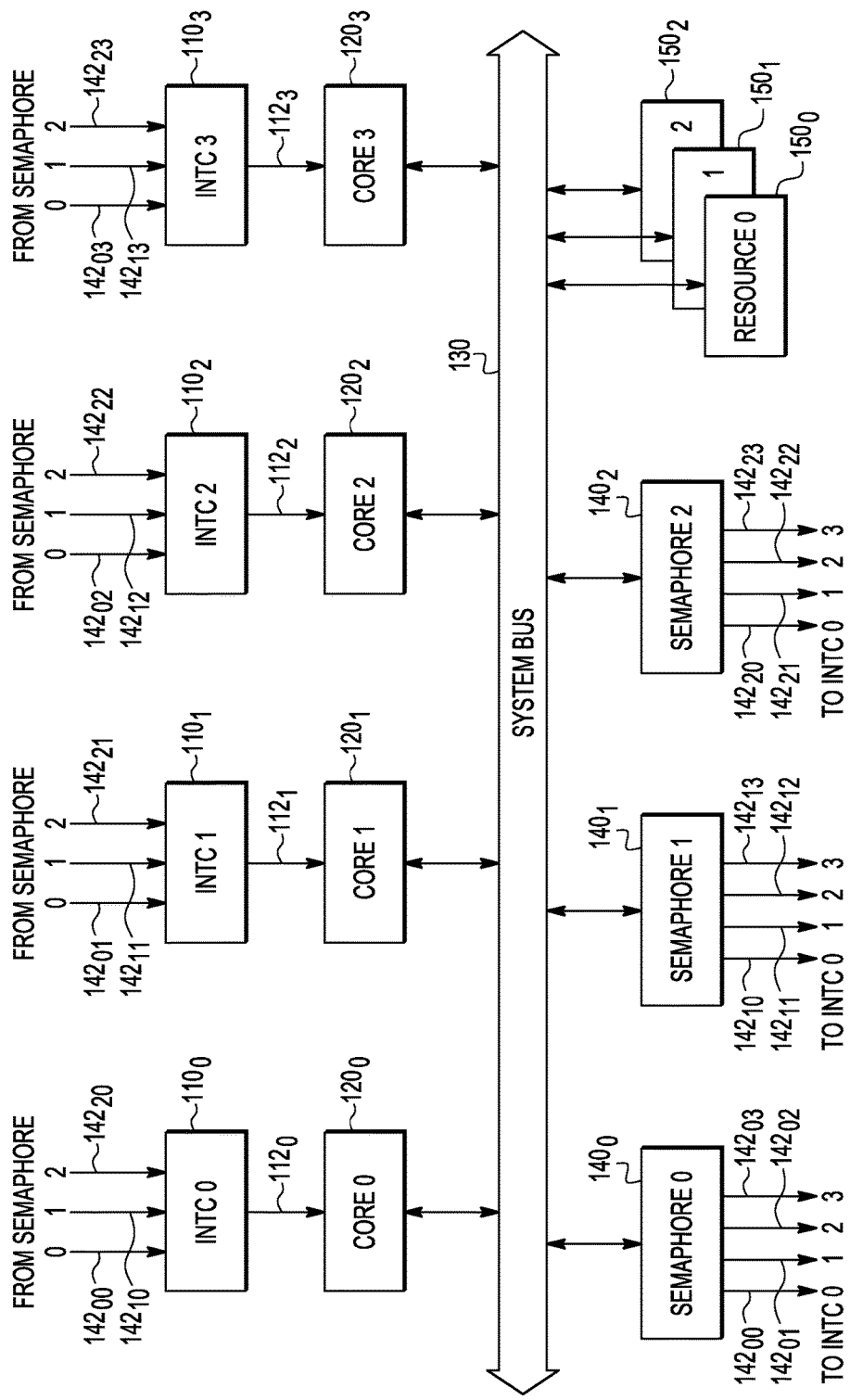
FIG. 1 is a schematic block diagram of a multi-core processor according to an embodiment of the present invention.

Detailed illustrative embodiments of the present invention are disclosed herein. However, specific structural and functional details to which the disclosure refers are merely representative for purposes of describing example embodiments of the present invention. Embodiments of the present invention may be embodied in many alternative forms and should not be construed as limited to only the embodiments set forth herein.

As used herein, the singular forms "a," "an," and "the," are intended to include the plural forms as well, unless the context clearly indicates otherwise. It further will be understood that the terms "comprises," "comprising," "has," "having," "includes," and/or "including" specify the presence of stated features, steps, or components, but do not preclude the presence or addition of one or more other features, steps, or components. It also should be noted that, in some alternative embodiments, certain functions or acts may occur out of the order indicated in the figures.

As used herein, the terms "assert" and "de-assert" are used when referring to the rendering of a control signal, status bit, or other relevant functional feature or element into its logically true and logically false state, respectively. If the logically true state is a logic level one, then the logically false state is a logic level zero. Alternatively, if the logically true state is logic level zero, then the logically false state is logic level one.

In various alternative embodiments, each logic signal described herein may be generated using positive or negative logic circuitry. For example, in the case of a negative logic signal, the signal is active low, and the logically true state corresponds to a logic level zero. Alternatively, in the case of a positive logic signal, the signal is active high, and the logically true state corresponds to a logic level one.

At least some of the above-indicated problems in the prior art are addressed by a multi-core processor system in which contention among the cores for access to a shared resource is managed using a semaphore that maintains separate access-request queues for different cores and uses a selectable scheduling algorithm to grant one of the pending requests at a time. The semaphore signals the core whose request is granted by sending thereto a respective interrupt signal using a respective dedicated core line that is not part of the system bus. The granted request is then de-queued, and the core accesses the shared resource in response to receiving the asserted interrupt signal. The use of the dedicated core lines for transmitting the interrupt signals from the hardware semaphore to the cores advantageously removes the need for repeated polling of the semaphore on the system bus, while the use of the scheduling algorithm advantageously prevents a potential race condition between the contending cores.

One embodiment of the present invention is a multi-core processing system including a plurality of cores, a first shared resource accessible by the cores by way of a system bus, and a first semaphore that operates to gate access to the first shared resource by the cores. The first semaphore resolves a contention for the first shared resource between different cores using a first scheduling algorithm. The first semaphore signals a core that wins the contention by sending it a respective asserted interrupt signal using a respective dedicated core line. The core that wins the contention then accesses the first shared resource in response to receiving the respective asserted interrupt signal.

Another embodiment of the present invention is a method of managing contention for access to a shared resource of a multi-core processing system among a plurality of cores thereof, the method includes the steps of maintaining a plurality of request queues, with each of the request queues being assigned to a respective core to queue therein one or more requests for access to the shared resource by the respective core, selecting from request queues a request to be granted using a first scheduling algorithm, and sending an asserted interrupt signal, on a respective dedicated core line, to cause the respective core whose request is granted to access the shared resource.

Referring not to FIG. 1, a schematic block diagram of a multi-core processor system 100 according to an embodiment of the invention is shown. For illustration purposes and without undue limitation, the system 100 is shown in FIG. 1 and described below as having four cores $120_0$-$120_3$ and three shared resources $150_0$-$150_2$. In an alternative embodiment, the number of the cores 120 in the system 100 can be different from four. Similarly, the number of the shared resources 150 in the system 100 can be different from three. In a preferred embodiment, the system 100 is fabricated on a single integrated circuit die.

As used herein, the term "core" refers to an independent processing unit of an electronic device, where the electronic device is, for example, a central processing unit (CPU), a digital signal processor (DSP), or a system-on-a-chip (SoC). A core can read and execute program instructions. The multiple cores of a multi-core processing system are able to run multiple instructions at the same time, thereby increasing the overall speed for programs amenable to parallel computing. Manufacturers can integrate the cores onto a single integrated-circuit (IC) die, referred to as a chip multiprocessor or CMP, or onto multiple dies assembled into a single IC package. Multi-core processor systems are used in many applications, such as, without limitation, general-purpose computing, embedded systems, networks, DSP systems, and graphics processing units (GPUs).

As used herein, the term "shared resource" refers to a hardware element of the system 100 that can be used by any of the cores $120_0$-$120_3$ in the course of performing their functions. An example non-exclusive list of shared resources includes: a last-level (e.g., L2 or L3) cache, a memory controller, an interconnect circuit, and a pre-fetching hardware module.

In addition to the cores $120_0$-$120_3$ and the shared resources $150_0$-$150_2$, the system 100 includes hardware semaphores $140_0$-$140_2$, all of which are interconnected by way of a system bus 130, e.g., as indicated in FIG. 1. A semaphore 140$i$ (where i=0, 1, 2) operates to gate access to the corresponding shared resource $150_i$ to ensure that the shared resource $150_i$ is used by a single one of the cores $120_0$-$120_3$ at a time. The semaphore $140_i$ uses a dedicated interrupt signal $142_{ij}$ (where j=0, 1, 2, 3) to signal the core $120_j$ if the shared resource $150_i$ is available for access. This interrupt signaling enables the core $120_j$ to avoid repeated polling of the semaphore $140_i$ by way of the system bus 130.

Each of the different interrupt signals $142_{ij}$ is applied to a respective interrupt controller (INTC) $110_j$ that responds to the interrupt signals $142_{ij}$ by issuing an appropriate control signal on a core line $112_j$ for the core $120_j$. In an example embodiment, each of the interrupt signals $142_{ij}$ is a one-bit signal, whereas the control signal carried on the core line $112_j$ can be a multi-bit control signal or a core instruction. The interrupt controller $110_j$ operates to combine several sources of interrupt onto the core line $112_j$, while allowing priority levels to be assigned to its interrupt outputs. When the interrupt controller $110_j$ receives multiple asserted interrupt signals $142_{ij}$ and, optionally, other asserted interrupt signals (not explicitly shown in FIG. 1), the interrupt controller $110_j$ translates them into the corresponding control signal on the core line $112_j$ in the order of their relative priority. In various embodiments, some of the possible modes of assigning priorities to the interrupts include hard priorities, rotating priorities, and cascading priorities, all of which are known to persons of ordinary skill in the art.

When two or more of the cores $120_0$-$120_3$ are waiting for the (same) shared resource $150_i$ to become available for access, a race condition could potentially occur between the competing cores when that shared resource is released by the previously occupying core. To prevent such races between the competing cores $120_0$-$120_3$ for locking the just-released shared resource $150_i$, the corresponding semaphore $140_i$ operates to assert only a single one of the interrupt signals $142_{ij}$ at a time. The semaphore $140_i$ uses an operative scheduling algorithm to determine which one of the interrupt signals $142_{ij}$ to assert, e.g., as described in more detail below in reference to FIGS. 2-5.

Figure 2A:
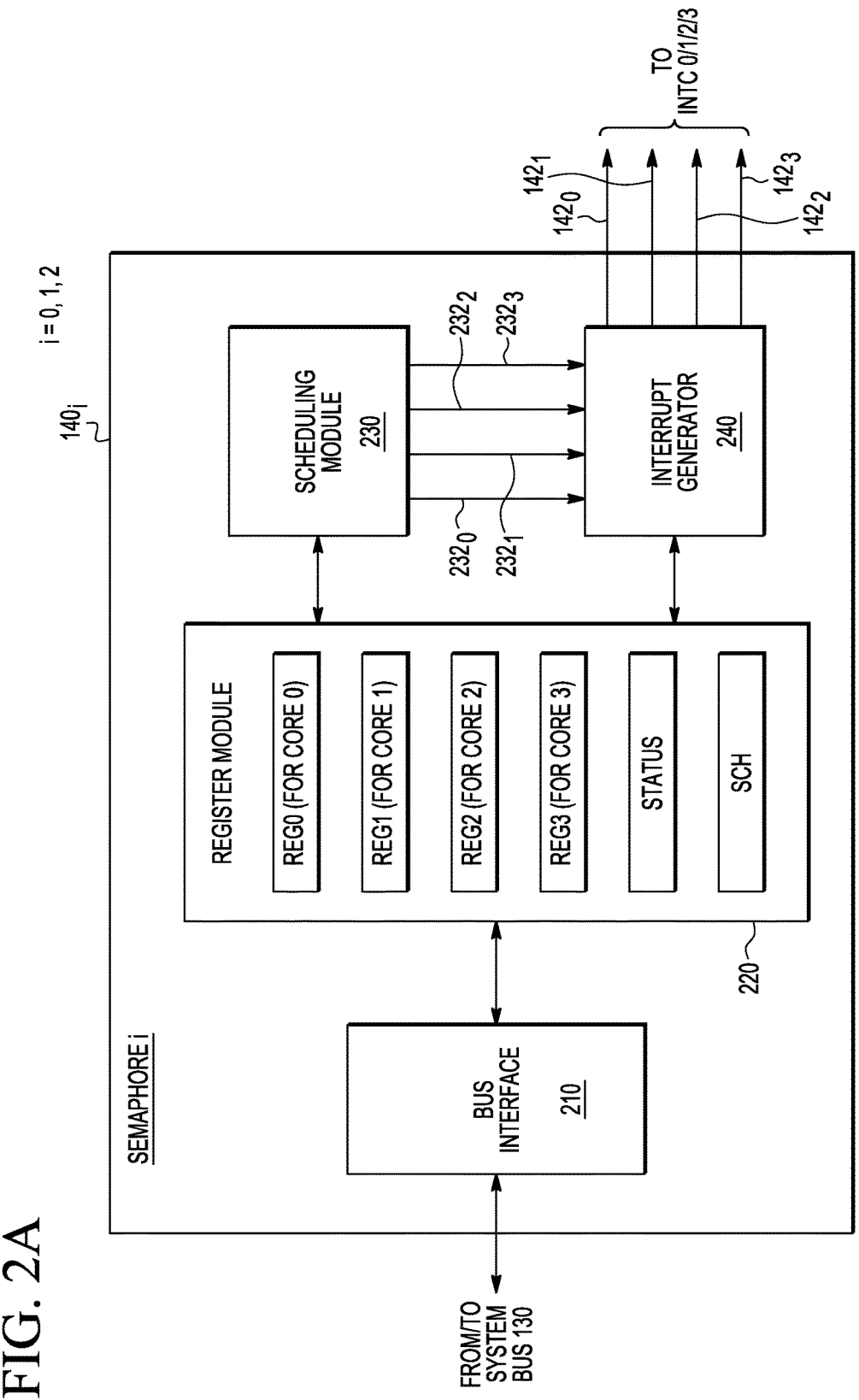
FIGS. 2A-2B are schematic block diagrams of a hardware semaphore that can be used in the system of FIG. 1 according to an embodiment of the invention.
Figure 2B:
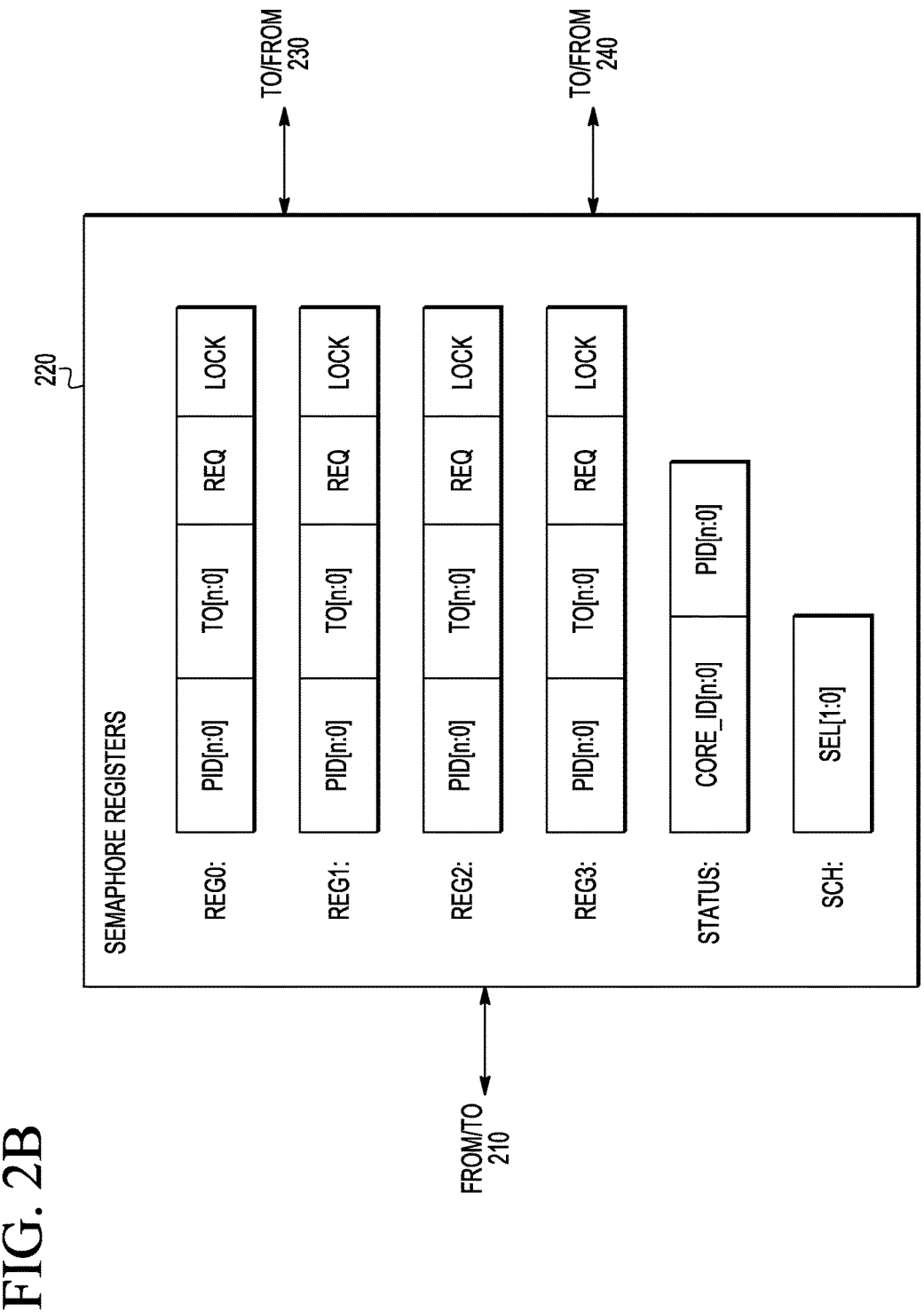

FIGS. 2A-2B are schematic block diagrams that illustrate the hardware semaphore $140_i$ (FIG. 1) according to an embodiment of the invention. More specifically, FIG. 2A is an overall block diagram of the semaphore $140_i$. FIG. 2B is a more-detailed block diagram of a register module 220 used in the semaphore $140_i$ of FIG. 2A.

In one embodiment, the semaphore $140_i$ comprises a bus interface 210, a register module 220, a scheduling module 230, and an interrupt generator 240. The bus interface 210 connects the semaphore $140_i$ to the system bus 130 (FIG. 1) and enables other circuits of the system 100 to read from and/or write to the register module 220. The register module 220 stores various parameter values pertinent to the intended function of the semaphore $140_i$ in six registers that are labeled REG0, REG1, REG2, REG3, STATUS, and SCH, respectively. The scheduling module 230 runs a selected scheduling algorithm to determine which one of the competing requests for access to the corresponding, just-released shared resource $150_i$ should be granted and then asserts one of the interrupt-enable signals $232_0$-$232_3$ accordingly. The interrupt generator 240 generates the interrupt signals $142_{ij}$ in response to the interrupt-enable signals $232_0$-$232_3$ received from the scheduling module 230.

Each of the registers REG0, REG1, REG2, and REG3 stores parameter values corresponding to a respective one of the cores $120_0$-$120_3$ in four respective fields that are labeled in FIG. 2B as PID, TO, REQ, and LOCK. The LOCK field in the register REGj has: (a) a binary "0" if the shared resource $150_i$ is not locked by the core $120_j$; and (b) a binary "1" if the shared resource $150_i$ is locked and/or being used by the core $120_j$. The REQ field in the register REGj has a binary "1" when the shared resource $150_i$ is requested by the core $120_j$, and a binary "0" otherwise. The TO field in the register REGj has a length of n+1 bits, as indicated by the length indicator [n:0], and is configured to store a relative time at which a timeout interrupt for the core $120_j$ is generated and/or some or all of the other parameter values in the register REGj are reset to a default state. If the TO field is set to zero, then the timeout control is disabled. If the core $120_j$ is a multi-process core, then the PID field of the register REGj stores the identification value of the process running on the core $120_j$ that requested or locked the shared resource $150_i$. If the core $120_j$ is a single-process core, then the PID field is set to zero.

The STATUS register has two fields that are labeled in FIG. 2B as CORE_ID and PID, respectively. The CORE_ID field is configured to store the identification value of the core 120 that is currently using the shared resource $150_i$. The PID field of the STATUS register is configured to store the identification value of the specific process that is using the shared resource $150_i$, if the corresponding core 120 is a multi-process core. The PID field is set to zero, if the corresponding core 120 is a single-process core.

The SCH register is illustratively shown as having a single 2-bit field labeled SEL. The binary value stored in the SEL field identifies the scheduling algorithm that is currently selected to run on the scheduling module 230. The following example illustrates one possible assignment of the SEL values.

If SEL[1:0]=00, then a Round-Robin algorithm is selected for the scheduling module 230. If SEL[1:0]=01, then a Weighted Round-Robin algorithm is selected for the scheduling module 230. If SEL[1:0]=10, then a Fixed-Priority algorithm is selected for the scheduling module 230. The SEL value of "11" is reserved for an additional scheduling algorithm to be added to the menu of available scheduling algorithms, e.g., at the time of the next system upgrade. Example Round-Robin, Weighted Round-Robin, and Fixed-Priority algorithms are described in more detail below in reference to FIGS. 5A-5C, respectively.

A person of ordinary skill in the art will understand that the above-indicated menu of the available scheduling algorithms is strictly for illustration purposes. In an alternative embodiment, a different set of scheduling algorithms can similarly be provided for selection by the semaphore $140_i$. Furthermore, the number of available scheduling algorithms can be different from three or four, in which case the length of the SEL field is adjusted accordingly.

Figure 3:
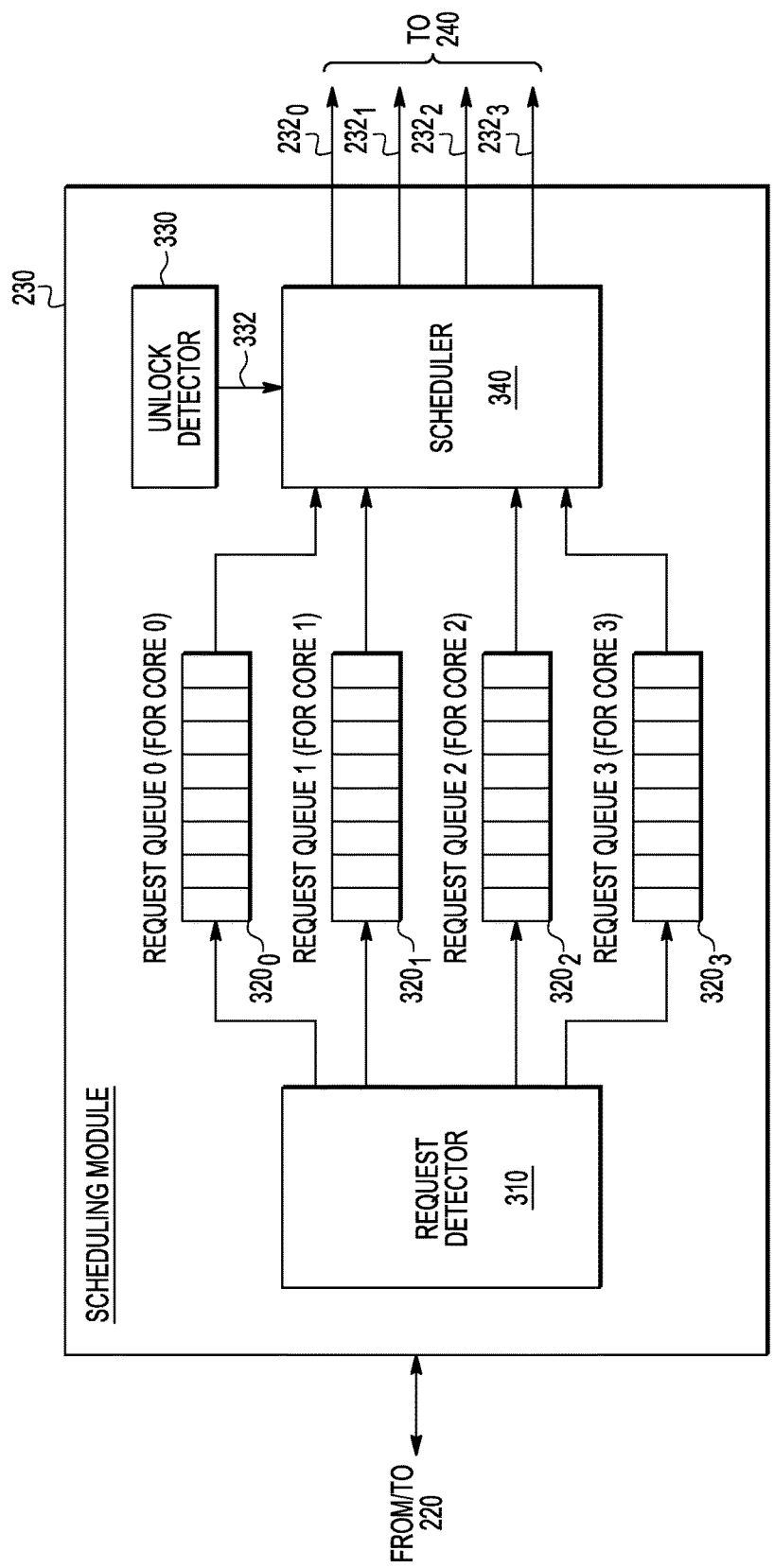
FIG. 3 is a schematic block diagram of a scheduling module that can be used in the hardware semaphore of FIG. 2 according to an embodiment of the invention.

FIG. 3 is a block diagram that illustrates the scheduling module 230 (FIG. 2) according to an embodiment of the invention. The scheduling module 230 comprises a request detector 310, four request queues $320_0$-$320_3$, an unlock detector 330, and a scheduler 340. The various circuits of the scheduling module 230 interact with each other, the register module 230 (FIGS. 2A-2B), and the interrupt generator 240, e.g., as further described below.

In operation, the request detector 310 responds to the contents of the REQ fields of the registers REG0-REG3 of the register module 230 (FIG. 2B). When the value in the REQ field of the register REGj (FIG. 2B) is set to a binary "1", the request detector 310 responds by logging a corresponding request at the end of the request queue $320_j$. After the request is queued, the scheduling module 230 resets the binary value in the REQ field of the register REGj to zero. If applicable, the queued request will include the PID value from the PID field of the register REGj (see FIG. 2B). In this manner, different processes run by the multi-process core $120_j$ are queued separately, albeit in the same request queue $320_j$.

The unlock detector 330 responds to the contents of the LOCK fields of the registers REG0-REG3 of the register module 230 (FIG. 2B). When the LOCK field of any of the registers REGj of the register module 230 (FIG. 2B) is cleared to zero, the unlock detector 330 responds by providing a corresponding unlock indicator 332 to the scheduler 340. As already explained above, the changing of the value stored in the LOCK field of the register REGj from "one" to "zero" means that the shared resource $150_i$ is released by the core $120_j$ and is now available for access by the other requesting cores 120.

The scheduler 340 responds to the unlock indicator 332 received from the unlock detector 330 by: (a) selecting, based on the currently active scheduling algorithm, one of the requests from the right (in the view of FIG. 3) ends of the request queues $320_0$-$320_3$ and (b) asserting a respective one of the interrupt-enable signals $232_0$-$232_3$. The scheduling module 230 then de-queues the selected request from the corresponding request queue 320, updates the values stored in the CORE_ID and PID fields of the STATUS register, and sets to "one" the value stored in the LOCK register of the respective one of the registers REGj of the register module 230 (FIG. 2B).

The interrupt generator 240 of the semaphore $140_i$ (FIG. 2A) responds to the asserted interrupt-enable control signal $232_j$ by asserting the interrupt signal $142_{ij}$. At the same time, the interrupt generator 240 starts a counter (not explicitly shown in FIG. 2A) if the value stored in the TO field of the register REGj is not zero. In this case, when the counter reaches the value stored in the TO field of the register REGj, a timeout interrupt is sent to the interrupt controller $110_j$, the LOCK field of the register REGj is cleared to zero, and a concomitant unlock indicator 332 is sent to the scheduler 340. In some embodiments, separate lines are used to transmit the timeout interrupts.

Figure 4:
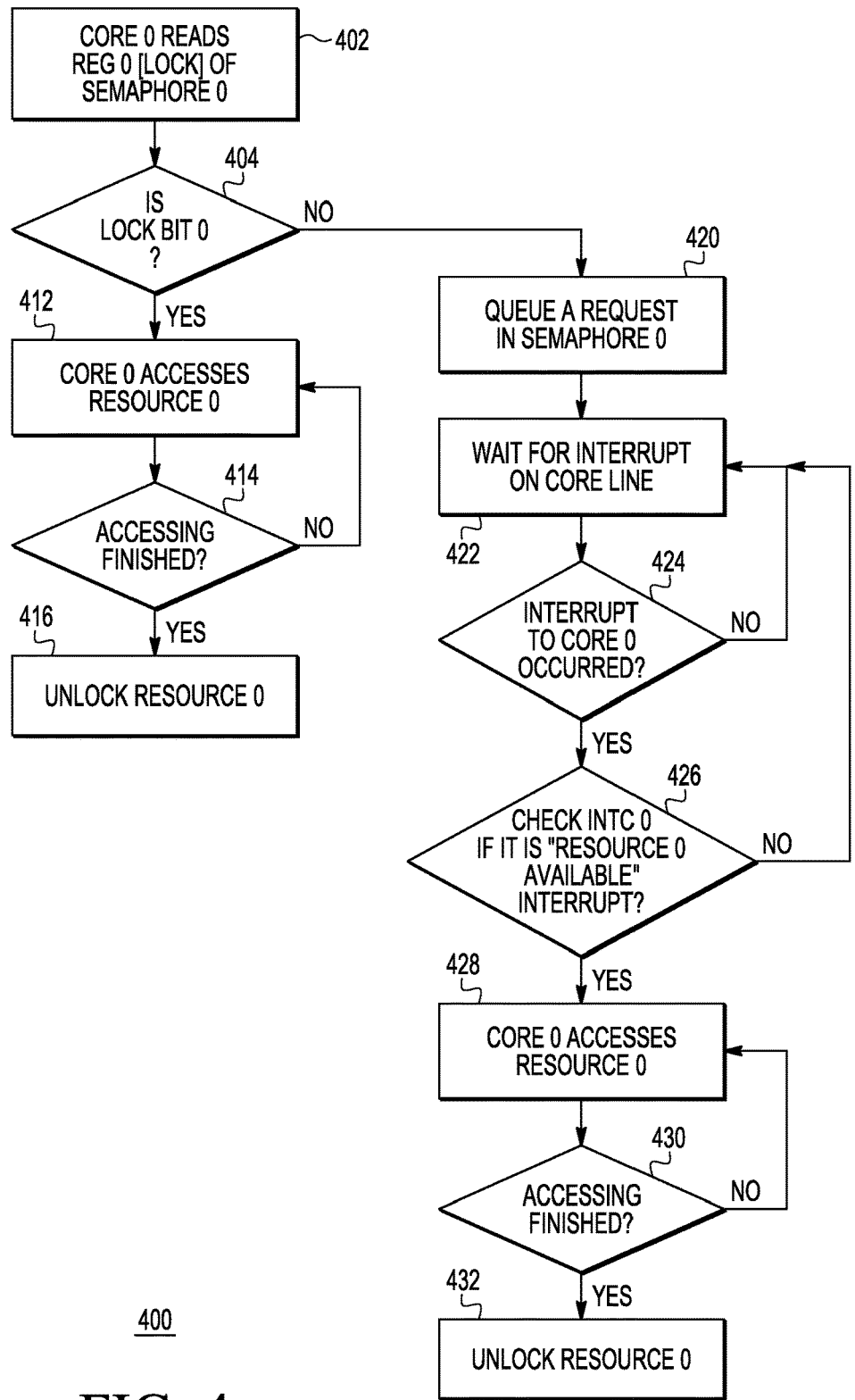
FIG. 4 is a flow chart of a shared-resource access method that can be used in the system of FIG. 1 according to an embodiment of the invention.

FIG. 4 is a flow chart of a shared-resource access method 400 that can be used in the system 100 (FIG. 1) according to an embodiment of the invention. For illustration purposes, the method 400 is described below using an example in which the core $120_0$ (CORE0) accesses the shared resource $150_0$ (RESOURCE0). A person of ordinary skill in the art will understand how to adapt the method 400 to a situation in which an arbitrary core $120_j$ accesses an arbitrary shared resource $150_i$.

At step 402 of the method 400, the core $120_0$ reads the LOCK field of the register REG0 in the register module 220 of the semaphore $140_0$ (SEMAPHORE0) (also see FIGS. 1, 2A, and 2B).

At step 404, it is determined whether or not the read LOCK field of the register REG0 has a binary zero stored therein. If the LOCK field of the register REG0 has a binary zero, then the processing of the method 400 is directed to step 412. Otherwise, the processing of the method 400 is directed to step 420.

In an example embodiment, when the core $120_0$ reads the LOCK field of the register REG0, the corresponding logic circuit of the register module 220 returns (REG0[LOCK] |REG1[LOCK]|REG2[LOCK]|REG3[LOCK]) as the LOCK-field value to the core $120_0$. If the returned LOCK-field value is a binary "one," then it means that the shared resource $150_0$ is occupied. As a result, the current request is queued at step 420, e.g., as further described below. If the returned LOCK-field value is binary "zero," then it means that the shared resource $150_0$ is available to the core $120_0$ for access. The corresponding logic circuit of the register module 220 therefore sets the value of REG0[LOCK] to binary "one," and the processing of the method 400 is directed to step 412.

At step 412, the core $120_0$ (CORE0) accesses the shared resource $150_0$ (RESOURCE0). The STATUS register in the register module 220 of the semaphore $140_0$ is updated accordingly to have therein the corresponding CORE_ID value and, where applicable, the PID value (also see FIG. 2B).

At step 414, it is determined whether or not the core $120_0$ has finished accessing the shared resource $150_0$. If the core $120_0$ has finished, then the processing of the method 400 is directed to step 416. Otherwise, the processing of the method 400 remains in the loop of steps 412 and 414. In some embodiments, the processing of the method 400 can exit this loop in response to a timeout interrupt generated by the interrupt generator 240 (FIG. 2) due to a non-zero value being stored in the TO field of the register REG0.

At step 416, the LOCK field of the register REG0 in the register module 220 of the semaphore $140_0$ is set to "zero" to unlock the shared resource $150_0$ (RESOURCE0).

At step 420, an access request is queued into the request queue $320_0$ of the scheduling module 230 of the semaphore $140_0$ (SEMAPHORE0). To achieve this result, the following sub-steps are executed. First, the REQ field of the register REG0 in the register module 220 of the semaphore $140_0$ is set to "one". Second, the request detector 310 responds to the "one" in the REQ field by logging a corresponding request at the end of the request queue $320_0$. Finally, after the request is queued, the binary value in the REQ field is set back to zero. If applicable, the queued request will include the PID value from the PID field of the register REG0 (see FIG. 2B).

At step 422, the core $120_0$ waits for an interrupt from the semaphore $140_0$ to arrive on the core line $112_0$ to be able to access the shared resource $150_0$. Note that no semaphore polling is taking place during step 422.

Steps 424 and 426 serve to filter out any other (not from the semaphore $140_0$) interrupts translated into control signals arriving on the core line $112_0$. This filtering is performed because, as already explained above, the interrupt controller $110_0$ (INTC0) may use the core line $112_0$ for transmitting such other translated interrupts as well. Step 424 operates to detect any translated interrupt received by the core $120_0$ on the core line $112_0$. Step 426 operates to detect the translated interrupt from the semaphore $140_0$ that indicates that the shared resource $150_0$ is now available for access by the core $120_0$. The processing of the method 400 proceeds on to step 428 only if both of the steps 424 and 426 are cleared affirmatively. Otherwise, the processing of the method 400 is looped back to step 422.

As already explained above, when the translated interrupt from the semaphore $140_0$ arrives on the core line $112_0$, the scheduling module 230 of the semaphore $140_0$ has already de-queued the corresponding request from the request queue $320_0$, updated the values stored in the CORE_ID and PID fields of the STATUS register, and set to "one" the value stored in the LOCK register of the register REG0 (also see FIG. 2B).

In an example embodiment, steps 428, 430, and 432 are similar to the above-described steps 412, 414, and 416, respectively. To reiterate, the loop of steps 428 and 430 is executed while the core $120_0$ is accessing the shared resource $150_0$. Step 432 causes the shared resource $150_0$ (RESOURCE0) to become unlocked and made available for access by other cores 120 and/or other processes. The next core/process to access the shared resource $150_0$ is selected using the request queues $320_0$-$320_3$ of the semaphore $140_0$ and in accordance with the currently active scheduling algorithm running on the scheduler 340 of that semaphore.

Figure 5A:
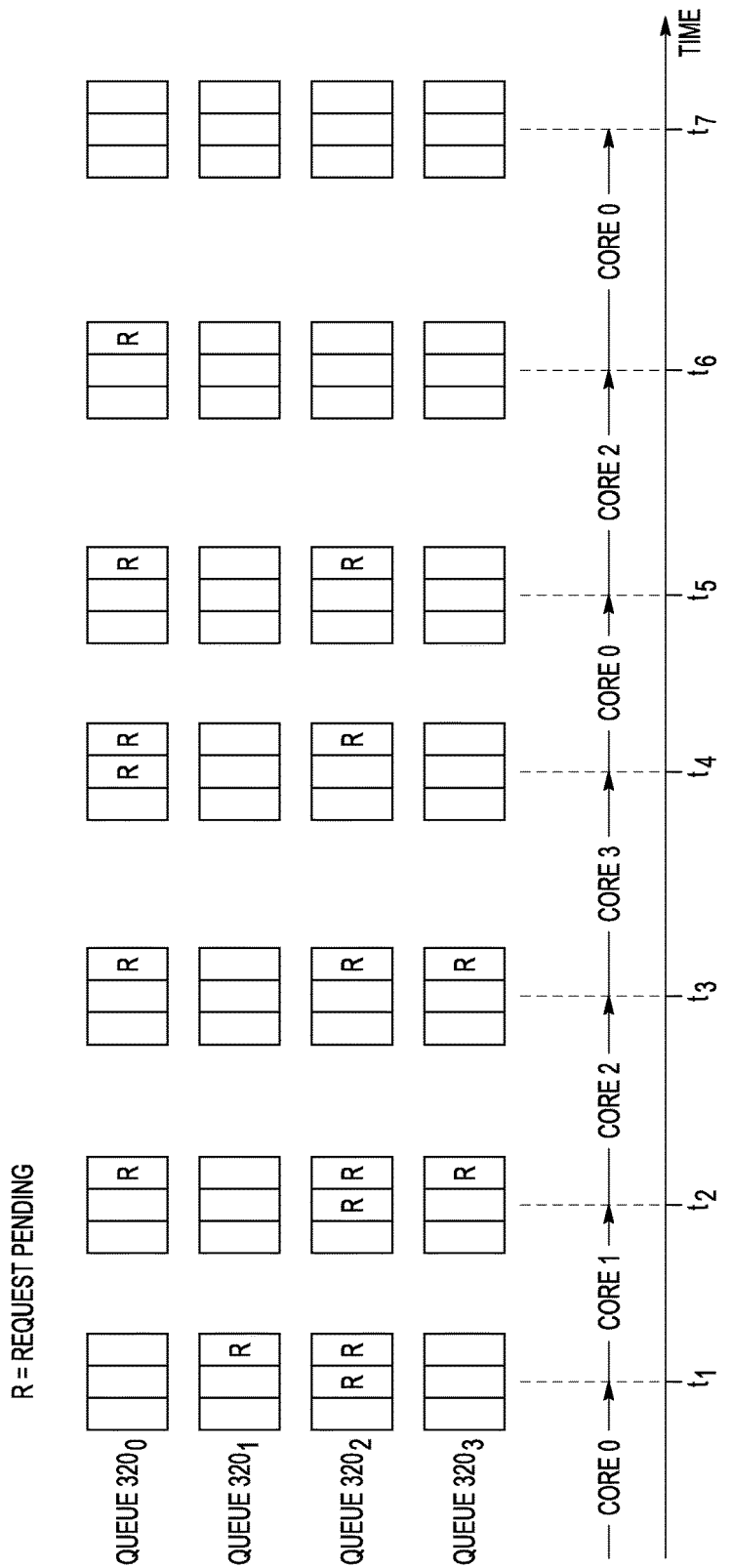
Figure 5B:
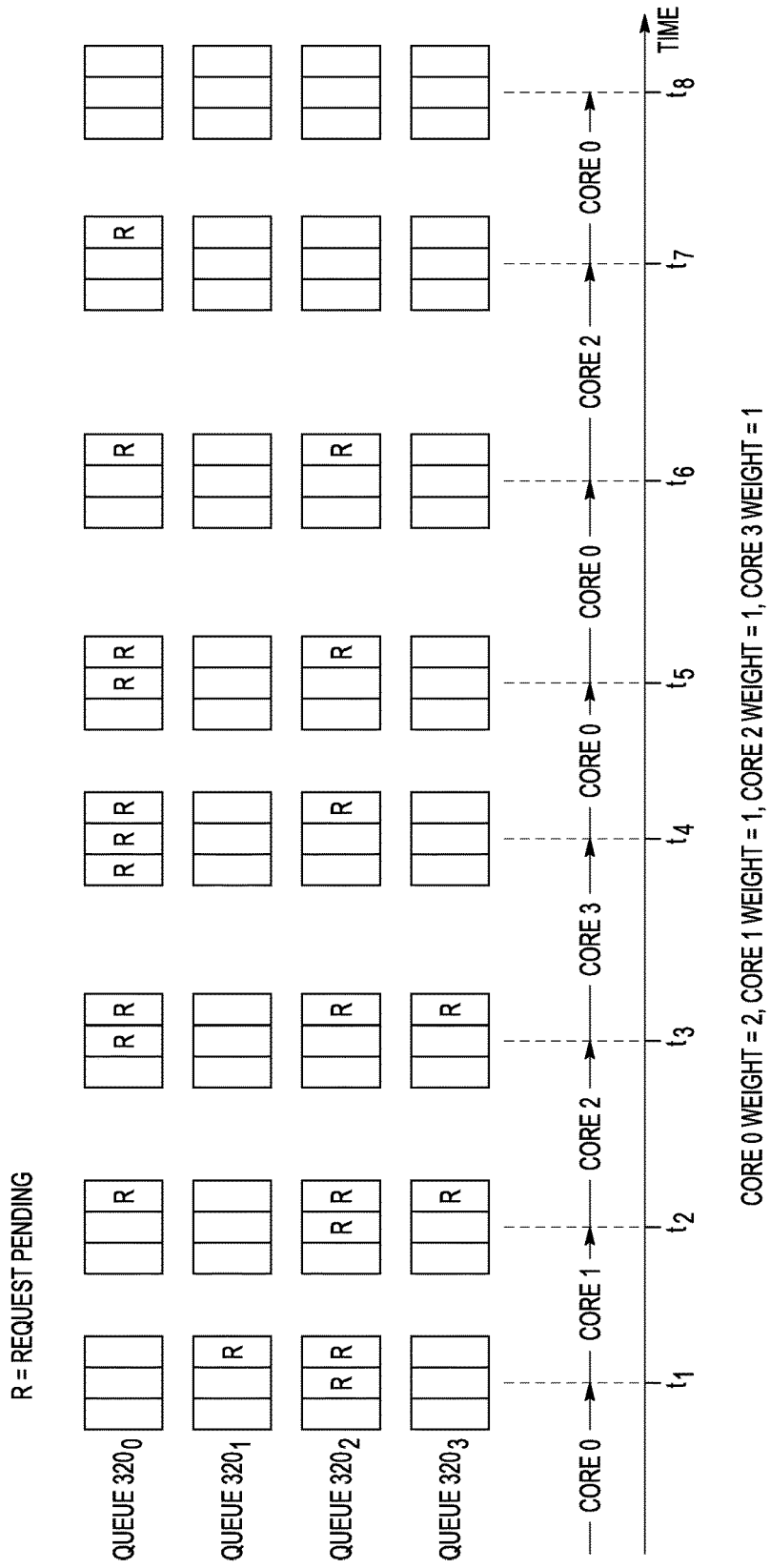

FIGS. 5A-5C are timing diagrams that graphically illustrate three example scheduling algorithms that can be used in the system 100 (FIG. 1) according to an embodiment of the invention. More specifically, FIG. 5A is a timing diagram that graphically illustrates the example Round-Robin algorithm. FIG. 5B is a timing diagram that graphically illustrates the example Weighted Round-Robin algorithm. FIG. 5C is a timing diagram that graphically illustrates the example Fixed-Priority algorithm. As explained above, any one of these scheduling algorithms can be selected to run on the scheduler 340 of the semaphore $140_i$, with the algorithm selection being controlled by the SEL value stored in the SCH register of the scheduling module 230 (also see FIGS. 2B and 3). For illustration purposes and without undue limitation, the examples shown in FIGS. 5A-5C correspond to the scheduling performed by the semaphore $140_0$ for granting access to the corresponding shared resource $150_0$. A person of ordinary skill in the art will understand that the scheduling performed by any other semaphore $140_i$ for granting access to the corresponding shared resource $150_i$ can be implemented in a similar manner.

Referring to FIG. 5A, the Round-Robin algorithm is selected if SEL[1:0]=00 (also see FIG. 2B). The time axis in FIG. 5A indicates the times $t_1$-$t_7$ at which the occupying core 120 unlocks the shared resource $150_0$. The identity of the occupying core is indicated along the corresponding horizontal arrow that leads up to the unlock time. For example, the occupying core 120 that unlocks the shared resource $150_0$ at the time $t_1$ is the core $120_0$ (CORE0). The occupying core 120 that unlocks the shared resource $150_0$ at the time $t_2$ is the core $120_1$ (CORE1). The occupying core 120 that unlocks the shared resource $150_0$ at the time $t_3$ is the core $120_2$ (CORE2), etc. The state of the request queues $320_0$-$320_3$ (also see FIG. 3) is shown for each of the times $t_1$-$t_7$ directly above the corresponding time mark. Each symbol R in the request queues $320_0$-$320_3$ represents a respective pending request.

The Round-Robin algorithm grants pending requests by selecting the request queues $320_0$-$320_3$ in a circular order and without priority. In the shown example, the circular order is as follows: 0→1→2→3→0. The next-up request queue 320 that does not have a pending request when the shared resource $150_0$ is unlocked is skipped.

At the time $t_1$, the request queue $320_1$ is the next queue in the circular order used by the Round-Robin algorithm. Since the request queue $320_1$ has a pending request R, that request R is granted at the time $t_1$ and de-queued from the request queue $320_1$. As a result the core $120_1$ (CORE1) becomes the occupying core.

At the time $t_2$, the request queue $320_2$ is the next queue in the circular order used by the Round-Robin algorithm. Since the request queue $320_2$ has a pending request R, that request R is granted at the time $t_2$ and de-queued from the request queue $320_2$. As a result the core $120_2$ (CORE2) becomes the occupying core.

Note that none of the next-up request queues 320 is skipped until the time $t_5$. At the time $t_5$, the request queue $320_1$ is the next queue in the circular order used by the Round-Robin algorithm. However, the request queue $320_1$ does not have a pending request R at the time $t_5$ and, as such, is skipped. Since the request queue $320_2$ (which is now the next queue in the circular order used by the Round-Robin algorithm) has a pending request R, that request R is granted at the time $t_5$ and de-queued from the request queue $320_2$. As a result the core $120_2$ (CORE2) becomes the occupying core.

At the time $t_6$, the request queue $320_3$ is similarly skipped because it does not have a pending request R. As a result, the request R from the request queue $320_0$ is granted at the time $t_6$.

At the time $t_7$, all of the request queues $320_0$-$320_3$ are empty.

FIG. 5B depicts the Weighted Round-Robin algorithm in a manner similar to the depiction used in FIG. 5A. In the shown example, the algorithm weights assigned to the request queues $320_0$-$320_3$ are 2, 1, 1, and 1, respectively. The Weighted Round-Robin algorithm differs from the above-described Round-Robin algorithm in that the number of requests R granted to the next-up request queue 320 is equal to the algorithm weight of that request queue, provided that it has a sufficient number of the pending requests R therein. An example of this type of scheduling is evident in FIG. 5B at the times $t_4$ and $t_5$. At these times, two pending requests R from the request queue $320_0$ are granted in a row because the algorithm weight of the request queue $320_0$ is two.

FIG. 5C depicts the Fixed-Priority algorithm in a manner similar to the depiction used in FIGS. 5A and 5B. In the shown example, the algorithm priorities assigned to the request queues $320_0$-$320_3$ are "highest," "high," "medium," and "low," respectively. Under the Fixed-Priority algorithm, a pending request R from the request queue having the highest priority among the request queues with pending requests R is granted at the unlock time. For example, at the time $t_1$, the request R from the request queue $320_1$ is granted because the request queue $320_1$ has a higher priority than the request queue $320_2$. At the time $t_2$, the request R from the request queue $320_0$ is granted because the request queue $320_0$ has a higher priority than either of the request queues $320_2$ and $320_3$. At the time $t_3$, a request R from the request queue $320_2$ is granted because the request queue $320_2$ has a higher priority than the request queue $320_3$, and so on.

While this disclosure includes references to illustrative embodiments, this specification is not intended to be construed in a limiting sense.

For example, although various embodiments are described above in reference to a hardware semaphore, embodiments of the invention are not so limited. Alternative embodiments may include semaphore devices that are implemented using software that is run by a general-purpose processor or core to provide appropriate instructions to other parts of the corresponding multi-core processor system. As such, the term "semaphore," as used in the claims, should be construed to cover both hardware-semaphore devices and software-semaphore devices.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

It will be further understood that various changes in the details, materials, and arrangements of the parts which have been described and illustrated in order to explain the nature of this invention may be made by those skilled in the art without departing from the scope of the invention as expressed in the following claims.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

The functions of the various elements shown in the figures, including but not limited to any functional blocks labeled as "processors" and/or "controllers," may be provided through the use of dedicated hardware as well as hardware capable of executing instructions in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements.

For purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. The terms "directly coupled," "directly connected," etc., imply that the connected elements are either contiguous or connected via a conductor for the transferred energy.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

The invention claimed is:

1. A multi-core processing system, comprising:
    a plurality of cores;
    a first shared resource accessible by the plurality of cores by way of a system bus; and
    a first semaphore that operates to gate access to the first shared resource by the plurality of cores,
    wherein the first semaphore resolves a contention for the first shared resource between different cores of the plurality of cores using a first scheduling algorithm,
    wherein the first semaphore signals a core that wins the contention by sending thereto a first respective asserted interrupt signal using a first respective dedicated core line,
    wherein the core that wins the contention accesses the first shared resource in response to receiving the first asserted interrupt signal, and
    wherein the first semaphore comprises:
        a plurality of request queues, each assigned to a respective core of the plurality of cores to queue therein one or more requests for access to the first shared resource by the respective core, wherein the plurality of request queues represents the contention for the first shared resource;
        a scheduler that selects from the plurality of request queues a request to be granted using the first scheduling algorithm;

an interrupt generator connected to the scheduler, wherein the scheduler sends a respective interrupt-enable signal to the interrupt generator to identify thereto the respective core whose request is granted, and the interrupt generator sends the respective asserted interrupt signal in response to the respective interrupt-enable signal; and a plurality of registers, each assigned to a respective core of the plurality of cores, wherein a binary value stored in a first field of each of the registers indicates whether the respective core has a pending request for access to the first shared resource, a binary value stored in a second field of each of the registers indicates whether the respective core has a lock on the first shared resource, and a binary value stored in a third field of each of the registers identifies a process running on the respective core that requested or locked the first shared resource.

2. The multi-core processing system of claim 1, wherein the first scheduling algorithm is selectable from a menu of two or more scheduling algorithms.

3. The multi-core processing system of claim 2, wherein the menu includes one or more of the following scheduling algorithms:
   a Round-Robin algorithm;
   a Weighted Round-Robin algorithm; and
   a Fixed-Priority algorithm.

4. The multi-core processing system of claim 1, further comprising:
   a second shared resource accessible by the plurality of cores by way of the system bus; and
   a second semaphore that operates to gate access to the second shared resource by the plurality of cores,
   wherein the second semaphore resolves a contention for the second shared resource between different cores of the plurality of cores using a second scheduling algorithm,
   wherein the second semaphore signals a core that wins the contention for the second shared resource by sending thereto a second respective asserted interrupt signal using a second respective dedicated core line; and
   wherein the core that wins the contention for the second shared resource accesses the second shared resource in response to receiving the second asserted interrupt signal.

5. The multi-core processing system of claim 4, wherein the second scheduling algorithm is different from the first scheduling algorithm, and each of the first and second scheduling algorithms is selectable from a menu of two or more scheduling algorithms.

6. The multi-core processing system of claim 4, further comprising:
   a different interrupt controller for each core, wherein each interrupt controller is connected to the corresponding core by way of a corresponding dedicated core line for receiving the respective first and second asserted interrupt signals from the first and second semaphores, and further connected to apply the respective first and second asserted interrupt signals to the corresponding dedicated core line.

7. The multi-core processing system of claim 6, further comprising:
   a plurality of signal transfer lines connected to transmit the respective asserted interrupt signals, with each of the signal transfer lines being connected between a respective one of the first and second semaphores and a respective one of the plurality of interrupt controllers, wherein the plurality of signal transfer lines are separate and distinct from the system bus.

8. The multi-core processing system of claim 1, wherein the first semaphore further comprises an additional register that stores a binary value that causes the first semaphore to select the first scheduling algorithm from a menu of two or more scheduling algorithms.

9. The multi-core processing system of claim 1, wherein a binary value stored in a fourth field of each of the plurality of registers specifies a respective relative time at which a timeout interrupt for the respective core is asserted.

10. The multi-core processing system of claim 1, wherein the plurality of cores, the first shared resource, the system bus, and the first semaphore are integrated on a single integrated circuit die.

\* \* \* \* \*